July 6, 1937.    F. J. KENNEDY    2,086,133
CONNECTION OR JOINT
Filed July 24, 1935
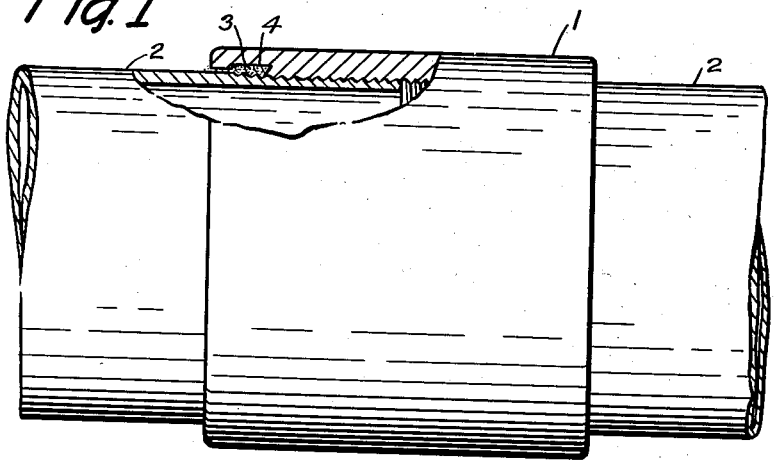
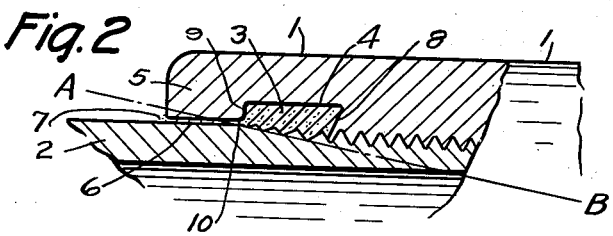
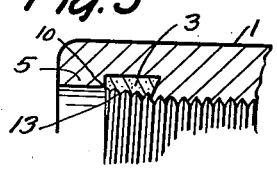    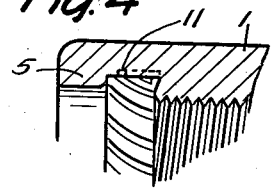    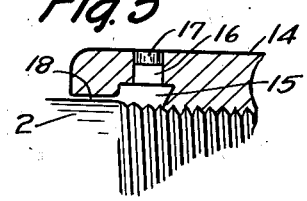
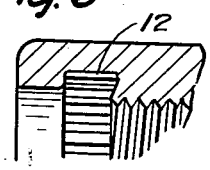    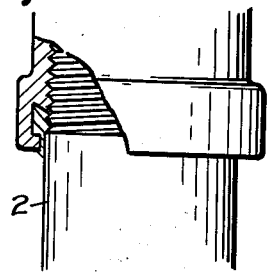    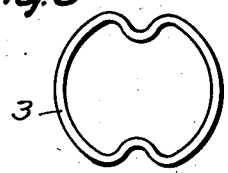
INVENTOR.
Frank J. Kennedy
BY
James Harrison Bowen
ATTORNEY.

Patented July 6, 1937

2,086,133

UNITED STATES PATENT OFFICE 2,086,133

CONNECTION OR JOINT

Frank J. Kennedy, Brooklyn, N. Y.

Application July 24, 1935, Serial No. 32,894

3 Claims. (Cl. 285—154)

The purpose of this invention is to provide a conduit or pipe coupling, fitting or connection through which perfect electrical continuity is obtained which is absolutely sealed against corrosion, which grips the conduit or internal member continuously along the threads beyond the last threads and develops the full strength of the conduit so that it is not weakened by the threads, thereby making it possible to use a conduit with a thinner wall, and in which all scars in the surface of the conduit are completely covered and sealed. The particular advantage of this invention is, therefore, that it increases the strength of a connection between two lengths of pipe, that is normally weakened by the material removed for the threads, and in which an attempt is made to compensate for the weakness by increasing the wall thickness of the pipe, although even this does not make it possible to provide a joint that will develop the full strength of the pipe; whereas by insuring substantially perfect contact or engagement between the coupling member and threads, extending an unthreaded portion over the outer surface of the pipe beyond the threads and extruding metal between said unthreaded portion and the surface of the pipe does make it possible to form a joint that develops the full strength of the pipe, thereby making it possible to reduce the wall thickness of the pipe, and at the same time develop absolute electrical continuity, which is very essential in conduit of this type.

The invention is a coupling or fitting for conduits, pipes, or the like having recesses in the ends thereof protected by overhanging lips forming bearings on the outer surface of the conduit beyond the last threads, and in which a relatively soft metal alloy or the like may be contained in said recesses, and which is so arranged that the soft metal will be crowded into the threads, and extruded out to or through the end of the joint as the conduit or pipe is screwed into the coupling or fitting.

Conduit and pipe are threaded in the shop, and the outer surface is covered by a protective coating of zinc or the like, and this is applied by electro-plating or an electro-lytical process, or by a process known as the Sherardizing process, or hot dipping process. Sherardizing and electro-plating leaves a deposit of zinc or the like on the threads and outer surface. Most of these substances are conductors, so that the electrical continuity is not destroyed, however, many joints have to be made in the field, and these are generally coated with paint or some other substance which is generally not a good conductor of electricity, and therefore it is desired to provide a substance that may be contained within the end of the coupling which, when the conduit is screwed into the coupling, will be crowded into the threads and extruded from the end of the joint to form a perfect bind or seal between the conduit and coupling.

Other couplings have been provided which are formed with an open recess at the end of the coupling member, through which soft metal may be extruded as the member is screwed on pipe, however, as the soft metal has not sufficent consistency to take load, such a device weakens the joint, because it only holds throughout the length of the threads in engagement, and part of the normal threads of the joint are removed in providing the circumferential recess for the soft material, and other couplings have been provided with unthreaded portions beyond the circumferential recess for the soft metal, but in these the unthreaded portion is of a smaller diameter than the outside diameter of the pipe, and these are adapted to spread to attempt to insure perfect contact with the unthreaded portion and pipe, however, in spreading the threads of the coupling member are forced out of or away from the threads of the pipe, so that the only positive contact is between the unthreaded portion and surface of the pipe, and this would have a tendency to form a loose joint or a joint in which "working" would be present and continuous side strains would therefore eventually loosen the joint.

The object of the invention is, therefore, to provide means in a conduit or pipe coupling or connection for insuring electrical continuity, a perfect seal, and also for transferring the complete wall strength of the conduit to and through the coupling or connection.

Another object is to provide a conduit coupling in which the outer edges thereof substantially engage with the outer surfaces of the conduit.

Another object is to provide a conduit coupling having sealing means therein which is substantially of the same size as couplings now in use.

A further object is to provide sealing means in a conduit coupling in which the bind thereof will be increased the further the conduit is turned into the coupling.

And a still further object is to provide a conduit or pipe coupling or connection which is sealed against corrosion, and which also develops greater strength, materially reducing the cost of the conduit system.

With these ends in view, the invention embodies a coupling or fitting formed with circumferential recesses on the inside of the outer ends thereof in which a comparatively soft metal alloy may be contained, or in which soft metal alloy rings may be placed as the coupling is used, and in which the ends thereof extend beyond the last threads, thereby forming gripping means on the surface of the conduit or pipe and developing the full strength thereof.

Other features and advantages of the invention will appear from the following description taken in connection with the drawing, wherein:

Figure 1 is a view showing a side elevation of a coupling with part broken away showing a section through one side thereof.

Figure 2 is an enlarged detail of the coupling shown in Figure 1.

Figure 3 is a similar detail of a portion of the coupling with the pipe omitted showing the soft metal threaded.

Figure 4 is a similar detail with the pipe and soft metal omitted showing the inner surface of the recess scored.

Figure 5 is a similar detail showing an opening through the back of the recess through which the soft metal may be injected and for indentification.

Figure 6 is a similar detail showing another alternate arrangement in which the inner surface of the recess is provided with grooves to prevent the soft metal turning in the fitting.

Figure 7 is a detail showing the device used in a pipe fitting instead of a coupling as shown in Figure 1.

Figure 8 is a view showing the soft metal ring as it may be provided with portions thereof bent inward to reduce the diameter thereof, thereby making it possible to pass the ring through the end of the fitting and swedge or roll it into the recess in the field, or as desired.

In the drawing the coupling is shown as it may be made wherein numeral 1 indicates the coupling, numeral 2 the conduit, and numeral 3 the soft metal that may be contained in a recess in the coupling.

The coupling 1 may be of any type or design, however it is preferred to use a coupling of the type normally used which is in the form of a cylindrical sleeve with straight threads extending continuously therethrough and on the inner surface. The outer ends of this coupling are provided with circumferential recesses 4 spaced a short distance from the ends, providing unthreaded portions 5, the internal diameters of which are slightly larger than the outside diameter of a pipe upon which the coupling member may be screwed. The recesses 4 are relatively shallow, providing sufficient material between their outside diameters and the outside diameter of the coupling member to prevent spreading of the overhanging lips or unthreaded portions 5, as shown in detail in Figure 2. The unthreaded portions 5 substantially engage the outer surfaces of the pipes, but as all pipe is formed one thirty-second to one sixty-fourth of an inch out of round, it would be impossible to fit this portion snugly on the pipe and, therefore, a tight bind is dependent upon the soft metal 3 being extruded through the thin space, approximately several thousandths of an inch, between the surface of the part 5, and the pipe, and this thin film of material is sufficient to withstand the load and guarantee positive rigid holding between the extreme ends of the coupling member and pipe, therefore guaranteeing against working at the joint. As the unthreaded surface is spaced slightly from the exterior of the pipe, it permits positive contact and engagement between all the threads of the pipe and coupling member and, therefore, forms a continuous positive joint from the inner end of the pipe to the outer end of the coupling member. A relatively soft metal alloy 3 is embedded in the recesses and the inner surfaces thereof may also be threaded, and it will be noted that with this soft metal in the recesses 4, the threads on the conduit will cut into the soft metal as the end of the conduit is screwed into the coupling, and as it passes up the incline of the tapering pipe thread, as indicated by the line A—B, shown in Figure 2, it will become crowded and therefore will be forced into the threads and extruded through the relatively thin space between the inside diameter of the overhanging lips 5 at the outer end of the coupling and the outer surface 6 of the conduit, as indicated at the point 7 in Figure 2. This crowding is accentuated by the taper of the threads, and particularly by the imperfect threads, and the pitch thereof as indicated by the line A—B shown in Figure 2, and as this conduit or pipe is screwed tight in the coupling, the soft metal will form a wedge, and thereby provide a completely sealed joint, assuring electrical continuity. The soft metal may be extruded out of the end, as indicated at the point 7, shown in Figure 2, thereby forming a complete bind between the conduit and coupling at a point where the area of the metal of the conduit is not reduced by the pipe threads. It will be understood that with the soft metal squeezed into every possible crack, crevice or space between the threads of the fitting and the threads of the pipe or conduit, and also extruded through the slight space between the lip and surface of the pipe or conduit, an absolute bind and seal will be obtained, and also a perfect and rigid joint developing all of the strength of the pipe. The space between the inner surface of the lip and the outer surface of the pipe or conduit is comparatively small, approximately five thousandths of an inch, or just enough to compensate for unevenness in the surface of the pipe or conduit so that this will substantially hold against the pipe, and with the soft metal forced therethrough positive holding will be assured.

The inner surface 8 at the end of the recess 4 may be inclined to hold the soft metal 3 in the recess, and the soft metal may be poured or wedged into this recess in any manner or by any means. The outer surface 9 may be straight, as shown, or also inclined, and the lower corner may be rounded as shown at the point 10 to facilitate passage of the soft metal through the space under the lip 5. The inner surface or base of the recess may be smooth as shown in Figures 1 and 2, or roughened to prevent the soft metal turning therein, as shown in Figures 4 and 6. Figure 4 shows scores 11 in the inner surface and Figure 6 shows grooves 12 in this surface, however it may be roughened in any manner.

The inner surface of the metal 3 is preferably threaded as shown at the point 13 in Figure 3 so that it will fit into the threads and will be squeezed all the way down to the root of the threads as the pipe or conduit is screwed into the coupling or fitting. This surface, however, may be straight or formed in any manner. This soft metal may also be poured into the recess through an opening or openings extending from the recess through the wall of the coupling, as shown in Figure 5, in which the coupling is indicated by the numeral 14, the recess by the numeral 15, and the openings by the numeral 16, and after the soft metal has been injected, poured, or forced into the recess the outer end of the opening 16 may be sealed by a red disc, washer, or plug 17, and this may also be used as a trademark to signify a red seal joint indicating that a soft metal has been used therein. It will be understood that any number of openings may be used, and these may be sealed in any manner. In this design the coupling may be used without the soft metal and after the pipe or conduit has been screwed therein the soft metal may be placed in the recess through the opening or openings. It will also be understood that the coupling may only be partly screwed upon the pipe or conduit before the soft metal is placed in the recess, and then after the soft metal has set it may be screwed the rest of the way so that the soft metal will be forced against the tapering imperfect threads, and thereby squeezed down to the root of the threads and also through the opening 16 between the overhanging lip of the coupling and surface of the pipe.

This soft metal may also be placed in the recess in the field, or as desired, and may be supplied as shown in Figure 8 so that the diameter thereof will be decreased sufficiently to permit it to pass through the opening at the end of the coupling or fitting, and then it may be swedged or pressed into the recess. It will also be understood that this ring of soft metal may be formed in any manner and placed in the recess by any means.

It will be understood, however, that any other means may be employed for providing a soft metal alloy which may be any material such as a copper or tin alloy, or any similar alloy ranging from lead to babbitt, which is of sufficient strength to screw on the threads or to be contained as a solid substance in the recess in the coupling.

It will be understood that other changes may be made in the construction without departing from the spirit of the invention, one of which changes may be in the use of the device in a fitting, or for a pipe of any other type or for any other purpose, another may be in the use of other means for holding the soft metal in the coupling, and still another may be in the use of other means for crowding the soft metal into the threads and against the surface of the pipe.

The construction will be readily understood from the foregoing description. In use the device may be provided by embedding a soft metal alloy in recesses in the coupling, as shown and described, or by providing the alloy as a separate and independent unit adapted to be placed in the coupling or on the conduit, and when the coupling is screwed on the pipe, or the pipe into the coupling, this metal will be crowded into the threads so that it will substantially form a homogeneous mass with direct contact and complete electrical continuity between the conduit and coupling. The soft metal will completely cover all scars in the surface of the conduit or imperfections in the thread, thereby forming the best possible protection against corrosion and providing means for transferring the complete wall strength of the conduit to the coupling.

This coupling or fitting embodying the use of lead or soft metal in a recess within the end of the fitting positioned to correspond with the imperfect threads of the pipe and protected by an overhanging lip under which the soft metal is extruded intended for absolute continuity in conduits or pipe connections, also increases the strength of the joint, as the overhanging lip provides a bearing beyond the last thread which holds against the outer surface of the pipe or conduit, thereby making an absolute bind and increasing the strength, which permits material reduction in wall thickness of the pipe or conduit equivalent to the reduction in the area of the metal between the outside diameter of the pipe and the root of the imperfect threads, as in threading pipes for this coupling the die may be let out to compensate for the material lost in the taper of the imperfect thread, because the coupling holds throughout the length of the perfect threads, and also on the uncut surface of the pipe or conduit beyond the threads.

The pitch diameter of the threads on the pipe will be perceptibly greater as the result of the holding threads of the coupling extending continuously throughout the length of the perfect thread. The projecting lip at the end of the coupling which extends over the uncut wall of the pipe produces a nozzle effect, compelling the soft metal to flow through the small aperture between the inner diameter of the lip and the outer surface of the pipe which is several thousandths of an inch. The unthreaded overhanging lip, therefore, forms a check to prevent the soft metal passing out of the end of the coupling as in former devices, and as it is confined it is forced into the threads so that it crowds along the threads and is at the same time extruded through the thin space between the overhanging lip and the surface of the pipe, thereby providing a continuous positive bind or grip between the pipe and coupling member with all of the threads in complete engagement, and with the material of the pipe beyond the last threads also positively gripped and held.

This type of fitting also forms an absolute seal between the coupling, or fitting and the pipe, thereby insuring electrical continuity in the joint. The soft metal is jammed into the imperfect threads forming an absolute seal at this point, and also throughout the joint. The bevel surface at the inner end of the recess holds the metal in place in handling and also helps to crowd the soft metal into the threads and prevents the metal flowing backward, and also assists in extruding the metal through the small area between the overhanging lip and outer surface of the pipe.

This coupling also provides mechanical rigidity because all of the perfect threads of the pipe are in positive engagement with the coupling, and in addition to this the lip projecting beyond the last thread is in positive engagement with the outer surface of the uncut pipe, providing a two-point bearing and thereby materially increasing the strength of the joint.

In this joint the soft metal is threaded similarly to the inside of the coupling, thereby making it possible to force the metal completely downward into the root of the thread throughout the length of the imperfect threads, thereby insuring a positive bind or contact.

This joint also positively protects the soft metal which is embedded within the end thereof and not exposed to abuse, and as this metal is held between tapered walls of the recess, it cannot possibly work out. Being absolutely inclosed within the coupling, it is also protected in shipment, and also from abuse on the job and at the same time always in place and ready for use.

The protecting lip also makes reuse of this coupling possible as the soft metal is maintained within the recess, and when screwed upon another pipe, it will again be forced into the threads and extruded through the aperture in the same manner.

Having thus fully described the invention, what I claim as new and desire to secure by Letters Patent, is:

1. In a fitting for pipes, means to prevent corrosion of that portion of the pipe on which the protective coating has been destroyed by the process of cutting threads, comprising a soft metal ring inserted in a groove between the threaded portion and unthreaded end portion of a fitting, the inside diameter of said ring being of sufficiently smaller diameter than the diameter of the adjacent threads to provide sufficient metal to completely seal the space between the pipe and the unthreaded end of the fitting, said metal being extruded during the assembling of the fitting and the pipe.

2. In a fitting for pipes, means to prevent corrosion of that portion of the pipe on which the protective coating has been destroyed by the process of cutting threads, comprising a soft metal ring inserted in a groove between the threaded portion and unthreaded end portion of a fitting, the inside diameter of said ring being sufficiently proportioned to the diameter of the adjacent threads to provide sufficient metal to completely seal the space between the pipe and the unthreaded end of the fitting, said metal being extruded during the assembling of the fitting and pipe.

3. In a fitting for pipes, the combination of metallic pipe with threaded ends, with a fitting having means to prevent corrosion of that portion of the pipe on which the protective coating has been destroyed by the process of cutting threads, comprising a soft metal ring inserted in a groove between the threaded portion and unthreaded end portion of the fitting, the inside diameter of said ring being sufficiently smaller than the diameter of the adjacent threads to provide sufficient metal to completely seal space between the pipe and unthreaded end of the fitting, said metal being of a softer composition than the fitting, and being extruded during the assembling of the pipe and fitting, between the unthreaded end of the fitting and surface of the pipe.

FRANK J. KENNEDY.